United States Patent
Wang et al.

(10) Patent No.: US 12,432,706 B2
(45) Date of Patent: Sep. 30, 2025

(54) CARRIER AGGREGATION BANDWIDTH CLASSES WITH OVERLAPPING BANDWIDTH RANGES

(71) Applicant: Apple Inc., Cupertino, CA (US)

(72) Inventors: Fucheng Wang, Cupertino, CA (US); Anatoliy S Ioffe, Redwood City, CA (US); Camila Priale Olivares, Munich (DE)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 17/700,161

(22) Filed: Mar. 21, 2022

(65) Prior Publication Data

US 2022/0322351 A1    Oct. 6, 2022

Related U.S. Application Data

(60) Provisional application No. 63/169,638, filed on Apr. 1, 2021.

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .............. H04W 72/04; H04W 72/044; H04W 72/0446; H04W 72/0453; H04W 72/0457;

(Continued)

(56) References Cited

U.S. PATENT DOCUMENTS

| 2013/0242880 A1 | 9/2013 | Miao et al. |
| 2015/0358927 A1 | 12/2015 | Gao et al. |

(Continued)

FOREIGN PATENT DOCUMENTS

| CN | 103974319 A | 8/2014 |
| CN | 104126328 A | 10/2014 |

(Continued)

OTHER PUBLICATIONS

Verizon: "Release 17 FR2 bandwidth class", EGPP Draft, R4-2100264; Jan. 15, 2021 (XP051969420); retrieved from Internet—[https://ftp.3gpp.org/tsg_ran/WG4_Radio/TSGR4_98_e/Docs/R4-2100264.zip Rf-2100264 FR2bandwidth class.docs [retrieved on Jan. 15, 2021]].

(Continued)

*Primary Examiner* — Peter Chen
(74) *Attorney, Agent, or Firm* — FLETCHER YODER PC (57) ABSTRACT

Aggregated channel bandwidth classes that overlap in frequency are allocated for a fallback group. The fallback group may define an increased or maximum bandwidth of aggregated component carriers as allocated by a network. By enabling the aggregated channel bandwidth classes for a fallback group to overlap in frequency, for an available aggregated channel bandwidth, a first aggregated channel bandwidth class may be implemented using a first number of component carriers, and a second aggregated channel bandwidth class may be implemented using a second number of component carriers different from the first. The different number of component carriers may enable more flexibility to more fully utilize the available aggregated channel bandwidth for communication. The network may then allocate one of these aggregated channel bandwidth classes to user equipment that more fully utilizes the available aggregated channel bandwidth for communication.

20 Claims, 7 Drawing Sheets

| | 70 | 72 | 74 | 76 |
|---|---|---|---|---|
| | CA BW CLASS | AGGREGATED CHANNEL BW | NUMBER OF CC | FALLBACK GROUP |
| | FG1A | $BW_{Channel\_CA} \leq 400$ MHZ | 1 | 1 |
| 100 | FG1B | $150$ MHZ $\leq BW_{Channel\_CA} \leq 800$ MHZ | 2 | 1 |
| 102 | FG1C | $350$ MHZ $\leq BW_{Channel\_CA} \leq 1200$ MHZ | 3 | 1 |
| | FG1D | $750$ MHZ $\leq BW_{Channel\_CA} \leq 1600$ MHZ | 4 | 1 |
| | FG1E | $1150$ MHZ $\leq BW_{Channel\_CA} \leq 2000$ MHZ | 5 | 1 |
| | FG1F | $1550$ MHZ $\leq BW_{Channel\_CA} \leq 2400$ MHZ | 6 | 1 |

(58) Field of Classification Search
CPC ..... H04W 72/50; H04W 72/51; H04W 72/21; H04W 72/23; H04W 72/231; H04W 72/232; H04W 8/24; H04W 8/245; H04L 5/0007; H04L 5/001; H04L 5/0091; H04L 5/0092; H04L 5/0096; H04L 5/0098
See application file for complete search history.

(56) References Cited

U.S. PATENT DOCUMENTS

| | | | |
|---|---|---|---|
| 2020/0260265 A1* | 8/2020 | Jin | H04W 8/24 |
| 2022/0173845 A1* | 6/2022 | Zhang | H04W 72/21 |
| 2023/0224719 A1* | 7/2023 | Tiirola | H04L 5/001 |
| | | | 370/329 |

FOREIGN PATENT DOCUMENTS

| | | |
|---|---|---|
| EP | 4017059 A1 | 6/2022 |
| WO | 2013135952 A1 | 9/2013 |
| WO | 2021031018 A1 | 2/2021 |

OTHER PUBLICATIONS

Mediatek Inc.; "FR2 CA bandwidth classes for aggregated channel BW1200 MHz", 3GPP Draft; R4-2000756, Feb. 14, 2020 (XP051850718); retrievied from Internet—[https://ftp.3gpp.org/tsg_ran/WG4_Radio/TSGR4_94_e/Docs/R4-20000756.zip R4-2000756.docx [retrieved on Feb. 14, 2020]].

Extended European Search Report for EP Patent Application No. 22164059.2 dated Jul. 19, 2022; 11 pgs.

* cited by examiner

| NR CA BANDWIDTH CLASS | AGGREGATED CHANNEL BANDWIDTH | NUMBER OF CONTIGUOUS CC | FALLBACK GROUP |
|---|---|---|---|
| A | $BW_{Channel\_CA} \leq 400$ MHZ | 1 | 1,2,3,4 |
| 90  B | 400 MHZ < $BW_{Channel\_CA} \leq 800$ MHZ | 2 | 1 |
| 92  C | 800 MHZ < $BW_{Channel\_CA} \leq 1200$ MHZ | 3 | 88 |
| 82  D | 200 MHZ < $BW_{Channel\_CA} \leq 400$ MHZ | 2 | 2 |
| 84  E | 400 MHZ < $BW_{Channel\_CA} \leq 600$ MHZ | 3 | 80 |
| 86  F | 600 MHZ < $BW_{Channel\_CA} \leq 800$ MHZ | 4 |  |
| G | 100 MHZ < $BW_{Channel\_CA} \leq 200$ MHZ | 2 | 3 |
| H | 200 MHZ < $BW_{Channel\_CA} \leq 300$ MHZ | 3 |  |
| I | 300 MHZ < $BW_{Channel\_CA} \leq 400$ MHZ | 4 |  |
| J | 400 MHZ < $BW_{Channel\_CA} \leq 500$ MHZ | 5 |  |
| K | 500 MHZ < $BW_{Channel\_CA} \leq 600$ MHZ | 6 |  |
| L | 600 MHZ < $BW_{Channel\_CA} \leq 700$ MHZ | 7 |  |
| M | 700 MHZ < $BW_{Channel\_CA} \leq 800$ MHZ | 8 |  |
| O | 100 MHZ $\leq BW_{Channel\_CA} \leq 200$ MHZ | 2 | 4 |
| P | 150 MHZ $\leq BW_{Channel\_CA} \leq 300$ MHZ | 3 |  |
| Q | 200 MHZ $\leq BW_{Channel\_CA} \leq 400$ MHZ | 4 |  |
| NOTE1: MAXIMUM SUPPORTED COMPONENT CARRIER BANDWIDTHS FOR FALLBACK GROUPS 1, 2, 3 AND 4 ARE 400MHz, 200 MHZ, 100 MHZ AND 50 MHZ RESPECTIVELY EXCEPT FOR CA BANDWIDTH CLASS A.<br>NOTE2: IT IS MANDATORY FOR A UE TO BE ABLE TO FALLBACK TO LOWER ORDER CA BANDWIDTH CLASS CONFIGURATION WITHIN A FALLBACK GROUP. IT IS NOT MANDATORY FOR A UE TO BE ABLE TO FALLBACK TO LOWER ORDER CA BANDWIDTH CLASS CONFIGURATION THAT BELONG TO A DIFFERENT FALLBACK GROUP. ||||

*FIG. 4*

| CA BW CLASS | AGGREGATED CHANNEL BW | NUMBER OF CC | FALLBACK GROUP |
|---|---|---|---|
| FG1A | $BW_{Channel\_CA} \leq 400$ MHZ | 1 | 1 |
| FG1B | $150$ MHZ $\leq BW_{Channel\_CA} \leq 800$ MHZ | 2 | 1 |
| FG1C | $350$ MHZ $\leq BW_{Channel\_CA} \leq 1200$ MHZ | 3 | 1 |
| FG1D | $750$ MHZ $\leq BW_{Channel\_CA} \leq 1600$ MHZ | 4 | 1 |
| FG1E | $1150$ MHZ $\leq BW_{Channel\_CA} \leq 2000$ MHZ | 5 | 1 |
| FG1F | $1550$ MHZ $\leq BW_{Channel\_CA} \leq 2400$ MHZ | 6 | 1 |

*FIG. 5*

| CA BW CLASS | AGGREGATED CHANNEL BW | NUMBER OF CC | FALLBACK GROUP |
|---|---|---|---|
| FG2A | $BW_{Channel\_CA} \leq 200$ MHZ | 1 | 2 |
| FG2B | $150$ MHZ $\leq BW_{Channel\_CA} \leq 400$ MHZ | 2 | 2 |
| FG2C | $350$ MHZ $\leq BW_{Channel\_CA} \leq 600$ MHZ | 3 | 2 |
| FG2D | $550$ MHZ $\leq BW_{Channel\_CA} \leq 800$ MHZ | 4 | 2 |
| FG2E | $750$ MHZ $\leq BW_{Channel\_CA} \leq 1000$ MHZ | 5 | 2 |
| FG2F | $950$ MHZ $\leq BW_{Channel\_CA} \leq 1200$ MHZ | 6 | 2 |
| FG2G | $1150$ MHZ $\leq BW_{Channel\_CA} \leq 1400$ MHZ | 7 | 2 |
| FG2H | $1350$ MHZ $\leq BW_{Channel\_CA} \leq 1600$ MHZ | 8 | 2 |
| FG2I | $1550$ MHZ $\leq BW_{Channel\_CA} \leq 1800$ MHZ | 9 | 2 |

*FIG. 6*

| AGGREGATED CHANNEL BW (MHZ) | COMPOSITION (MHZ) | CA BW CLASS |
|---|---|---|
| 50 | 50 | FBG1A |
| 100 | 100 | FBG1A |
| 150 | 100+50 | FBG1B |
| 200 | 200 | FBG1A |
| 250 | 200+50 | FBG1B |
| 300 | 200+100 | FBG1B |
| 350 | 200+100+50 | FBG1C |
| 400 | 400 | FBG1A |
| 450 | 400+50 | FBG1B |
| 500 | 400+100 | FBG1B |
| 550 | 400+100+50 | FBG1C |
| 600 | 400+200 | FBG1B |
| 650 | 400+200+50 | FBG1C |
| 700 | 400+200+100 | FBG1C |
| 750 | 400+200+100+50 | FBG1D |
| 800 | 400+400 | FBG1B |
| 850 | 400+400+50 | FBG1C |
| 900 | 400+400+100 | FBG1C |
| 950 | 400+400+100+50 | FBG1D |
| 1000 | 400+400+200 | FBG1C |
| 1050 | 400+400+200+50 | FBG1D |
| 1100 | 400+400+200+100 | FBG1D |
| 1150 | 400+400+200+100+50 | FBG1E |
| 1200 | 400+400+400 | FBG1C |
| 1250 | 400+400+400+50 | FBG1D |
| 1300 | 400+400+400+100 | FBG1D |
| 1350 | 400+400+400+100+50 | FBG1E |
| 1400 | 400+400+400+200 | FBG1D |
| 1450 | 400+400+400+200+50 | FBG1E |
| 1500 | 400+400+400+200+100 | FBG1E |
| 1550 | 400+400+400+200+100+50 | FBG1F |
| 1600 | 400+400+400+400 | FBG1D |

FIG. 7

| AGGREGATED CHANNEL BW (MHZ) | COMPOSITION (MHZ) | CA BW CLASS |
|---|---|---|
| 50 | 50 | FBG2A |
| 100 | 100 | FBG2A |
| 150 | 100+50 | FBG2B |
| 200 | 200 | FBG2A |
| 250 | 200+50 | FBG2B |
| 300 | 200+100 | FBG2B |
| 350 | 200+100+50 | FBG2C |
| 400 | 200+200 | FBG2B |
| 450 | 200+200+50 | FBG2C |
| 500 | 200+200+100 | FBG2C |
| 550 | 200+200+100+50 | FBG2D |
| 600 | 200+200+200 | FBG2C |
| 650 | 200+200+200+50 | FBG2D |
| 700 | 200+200+200+100 | FBG2D |
| 750 | 200+200+200+100+50 | FBG2E |
| 800 | 200+200+200+200 | FBG2D |
| 850 | 200+200+200+200+50 | FBG2E |
| 900 | 200+200+200+200+100 | FBG2E |
| 950 | 200+200+200+200+100+50 | FBG2F |
| 1000 | 200+200+200+200+200 | FBG2E |
| 1050 | 200+200+200+200+200+50 | FBG2F |
| 1100 | 200+200+200+200+200+100 | FBG2F |
| 1150 | 200+200+200+200+200+100+50 | FBG2G |
| 1200 | 200+200+200+200+200+200 | FBG2F |
| 1250 | 200+200+200+200+200+200+50 | FBG2G |
| 1300 | 200+200+200+200+200+200+100 | FBG2G |
| 1350 | 200+200+200+200+200+200+100+50 | FBG2H |
| 1400 | 200+200+200+200+200+200+200 | FBG2G |
| 1450 | 200+200+200+200+200+200+200+50 | FBG2H |
| 1500 | 200+200+200+200+200+200+200+100 | FBG2H |
| 1550 | 200+200+200+200+200+200+200+100+50 | FBG2I |
| 1600 | 200+200+200+200+200+200+200+200 | FBG2H |

CARRIER AGGREGATION BANDWIDTH CLASSES WITH OVERLAPPING BANDWIDTH RANGES

CROSS-REFERENCE TO RELATED APPLICATIONS

This application claims priority to U.S. Provisional Application No. 63/169,638, filed Apr. 1, 2021, entitled "CARRIER AGGREGATION BANDWIDTH CLASSES WITH OVERLAPPING BANDWIDTH RANGES," the disclosure of which is incorporated by reference in its entirety for all purposes.

BACKGROUND

The present disclosure relates generally to wireless communication, and more specifically to efficiently using allocated bandwidth for communication.

In cellular communication, user equipment (e.g., a cell phone) may communicate (e.g., with a base station) under guidelines or rules that may be set and enforced by the Third Generation Partnership Project (3GPP). However, following such guidelines or rules may result in inefficiencies when communicating.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed embodiments allocate aggregated channel bandwidths for a fallback group that overlap in frequency. In this manner, user equipment may more fully utilize an allocated aggregated channel bandwidth for communication.

In one embodiment, a method includes receiving, at a base station, a request for a carrier aggregation bandwidth based on a fallback group from user equipment. The method also includes determining, via processing circuitry, an available aggregated channel bandwidth, and sending, from the base station, an indication of an aggregated channel bandwidth class to the user equipment based on the available aggregated channel bandwidth for the fallback group. The aggregated channel bandwidth class overlaps with another aggregated channel bandwidth class for the fallback group.

In another embodiment, an electronic device includes a receiver that receives a signal from user equipment, and a transmitter that sends a signal to the user equipment. The electronic device also includes at least one processor that receives a request for a carrier aggregation bandwidth based on a fallback group from user equipment, and determines an available aggregated channel bandwidth. The at least one processor also sends, via the at least one processor, an indication of an aggregated channel bandwidth class to the user equipment based on the available aggregated channel bandwidth for the fallback group. The aggregated channel bandwidth class is associated with a number of component carriers and enables the user equipment to utilize a full range of the available aggregated channel bandwidth using the number of component carriers.

In yet another embodiment, user equipment includes a transmitter that communicatively couples to a base station, and a receiver that communicatively couples to the base station. The user equipment also includes at least one processor that requests, via the transmitter, a carrier aggregation bandwidth based on a supported fallback group from the base station. The at least one processor also receives, via the receiver, an indication of an aggregated channel bandwidth class enabling the supported fallback group. The aggregated channel bandwidth class overlaps with another aggregated channel bandwidth class for the supported fallback group. The at least one processor further sends, via the transmitter, or receive, via the receiver, a signal to or from the base station over the aggregated channel bandwidth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 4 is a carrier aggregation bandwidth class chart for New Radio (NR) Frequency Range 2 (FRD), as set and enforced by the Third Generation Partnership Project (3GPP);

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

In cellular communication, user equipment (e.g., a mobile communication device, a cellular phone) may communicate (e.g., with a base station) using a single frequency block (e.g., a component carrier). For some standards, such as a $4^{th}$ generation (4G) or long term evolution (LTE®) standard, or a 5th generation (5G) or New Radio (NR) standard, the user equipment may communicate using multiple frequency blocks (e.g., referred to as carrier aggregation). In cases where the multiple frequency blocks are contiguous, guidelines or rules may be set and enforced by the Third Generation Partnership Project (3GPP) related to the allocated (e.g., total) bandwidth for communicating using the multiple frequency blocks, the individual bandwidth for each frequency block, the number of the contiguous multiple frequency blocks that may be used for communicating with the allocated bandwidth, and so on. However, following such guidelines or rules may result in inefficiencies when communicating using the multiple frequency blocks over the allocated bandwidth. In particular, according to the 3GPP specification, the aggregated channels in a carrier aggregation combination may not overlap.

The disclosed embodiments allocate aggregated channel bandwidth classes for a fallback group that overlap in frequency. The fallback group may define an increased or maximum bandwidth of aggregated component carriers as allocated by a network. By enabling the aggregated channel bandwidth classes for a fallback group to overlap in frequency, for an available aggregated channel bandwidth, a first aggregated channel bandwidth class may be implemented using a first number of component carriers, and a second aggregated channel bandwidth class may be implemented using a second number of component carriers different from the first. The different number of component carriers may enable more flexibility to more fully utilize the available aggregated channel bandwidth for communication (e.g., enables utilization of a lowest frequency of the available aggregated channel bandwidth to a highest frequency of the available aggregated channel bandwidth). The network may then allocate one of these aggregated channel bandwidth classes to user equipment that more fully utilizes the available aggregated channel bandwidth for communication.

Figure 1:
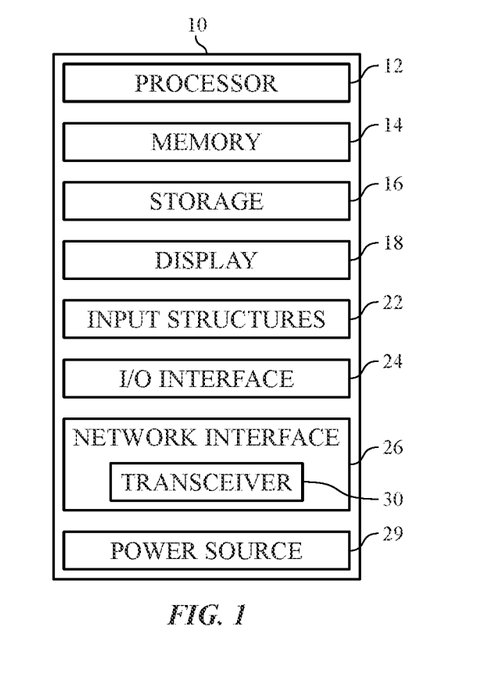
FIG. 1 is a block diagram of user equipment, according to embodiments of the present disclosure.

FIG. 1 is a block diagram of user equipment 10 (e.g., an electronic device, a wireless communication device, a mobile communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
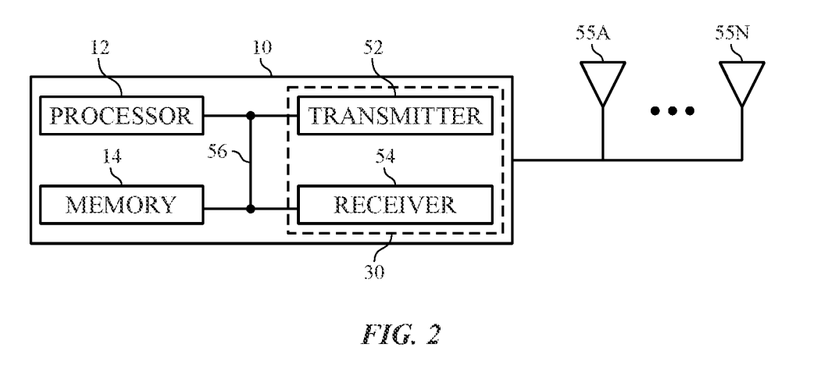
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
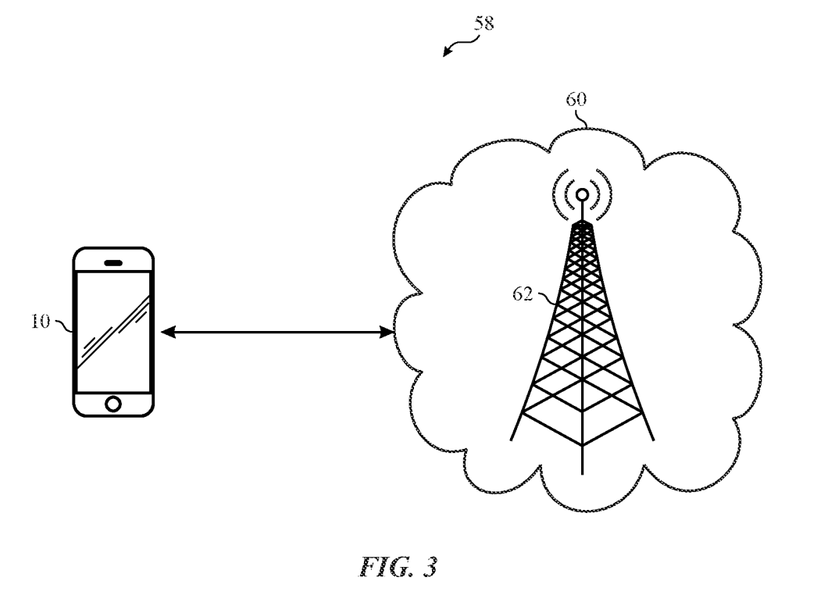
FIG. 3 is a schematic diagram of a communication system including the user equipment of FIG. 1 communicating with a communication network via a base station, according to embodiments of the present disclosure.

FIG. 3 is a schematic diagram of a communication system 58 including the user equipment 10 communicating with a communication network 60 via a base station 62, according to embodiments of the present disclosure. The network 60 may include any suitable communication network, such as a cellular network (e.g., a 3G cellular network, a 4G/LTE cellular network, a 5G/NR cellular network, or the like). Similarly, the base station 62 may include any suitable electronic device, such as a communication hub or node, that facilitates, supports, and/or implements the network 60, including a NodeB, an eNodeB, gNodeB, or the like. The network 60 and/or the base station 62 may include some or all of the components of the user equipment 10 shown in FIGS. 1 and 2 (e.g., including the processor 12, the memory 14, the storage device 16, the transceiver 30, the transmitter 52, the receiver 54, and so on). The user equipment 10 may communicate with the base station 62 using any suitable communication protocol, but purely as an example for the remainder of this disclosure, the user equipment 10 may communicate with the base station 62 using Frequency Range 2 (FR2) of the 5G/NR communication protocol (e.g., between 24.25 and 52.6 gigahertz (GHz)).

The user equipment 10 may request one or more frequency blocks or component carriers from the network 60, via the base station 62, with which the user equipment 10 may transmit and receive wireless (e.g., radio frequency) signals. In response, the network 60, via the base station 62, may allocate one or more component carriers. For some standards, such as a 4th generation (4G) or long term evolution (LTE®) standard, or a $5^{th}$ generation (5G) or New Radio (NR) standard, the network 60 may allocate multiple component carriers. Use of the multiple component carriers by the user equipment 10 to transmit and/or receive signals may be referred to as carrier aggregation. In cases where the multiple component carriers are contiguous (e.g., immediately next to each other in frequency, such that there are no frequency gaps in between multiple component carriers, guidelines or rules may be set and enforced by the Third Generation Partnership Project (3GPP) related to the allocated (e.g., total) bandwidth for communicating using the multiple component carriers, the individual bandwidth for each component carrier, the number of the contiguous multiple component carriers that may be used for communicating with the allocated bandwidth, and so on. In particular, according to the 3GPP specification, the aggregated channels in a carrier aggregation (CA) combination may not overlap. However, following such guidelines or rules may result in inefficiencies when communicating using the multiple component carriers over the allocated bandwidth.

For example, when performing carrier aggregation, if the network condition for user equipment 10 becomes low or poor (e.g., under a threshold level), then the network 60 may cause the user equipment 10 to reduce or fall back to less component carriers than the originally allocated and aggregated carriers (which may be referred to as a parent combination of aggregated carriers), according to a fallback group as defined by the 3GPP. That is, the network 60 may cause the user equipment 10 to release at least one component carrier of the parent combination when falling back to the less component carriers. In particular, the 3GPP specifies that the component carrier(s) that the network 60 may cause the user equipment 10 to fall back to must be in the same fallback group as the parent combination. A fallback group of a carrier aggregation combination is a group of fewer number of aggregated carriers (e.g., lower order carrier aggregation bandwidth classes) than a parent combination to which the user equipment 10 may recede or fallback. The fallback group may thus define an increased or maximum bandwidth of aggregated component carriers when communicating using carrier aggregation by the user equipment 10.

FIG. 4 is a carrier aggregation (CA) bandwidth (BW) class chart for NR FR2, as set and enforced by the 3GPP. The chart lists NR CA bandwidth classes 70 (e.g., A-Q) as set forth by the 3GPP specification, an aggregated channel bandwidth 72 for each NR CA bandwidth class 70, number of contiguous component carriers (CCs) 74 whose bandwidths are aggregated together to result in each aggregated channel bandwidth 72, and fallback group identifiers 76 to which each NR CA bandwidth class 70 belongs.

For example, for the user equipment 10 that supports Fallback Group 2 (as indicated by 80), three carrier aggregation bandwidth classes are available: D (as indicated by 82) corresponding to 2 contiguous component carriers, E (as indicated by 84) corresponding to 3 contiguous component carriers, and F (as indicated by 84) corresponding to 4 contiguous component carriers. The aggregated channel bandwidth for carrier aggregation bandwidth class D 82 is greater than 200 megahertz (MHz) and less than or equal to 400 MHz, the aggregated channel bandwidth for carrier aggregation bandwidth class E 84 is greater than 400 MHz and less than or equal to 600 MHz, and the aggregated channel bandwidth for carrier aggregation bandwidth class F 86 is greater than 600 MHz and less than or equal to 800 MHz. Accordingly, the aggregated channel bandwidths for the three carrier aggregation bandwidth classes D 82, E 84, and F 86 of Fallback Group 2 80 do not overlap in frequency. Moreover, for user equipment 10 that supports 50 MHz resolution, the user equipment 10 may communicate with the base station 62 using component carrier bandwidths of 50 MHz, 100 MHz, and 200 MHz (the maximum supported component carrier bandwidth being 200 MHz).

However, this may lead to inefficient usage of the aggregated channel bandwidth. For example, the base station 62 may allocate an aggregated channel bandwidth 350 MHz to user equipment 10 using Fallback Group 2 80. For the user equipment 10 using Fallback Group 2 80, this falls into Class D 82 (e.g., greater than 200 megahertz (MHz) and less than or equal to 400 MHz). Class D enables 82 use of two contiguous component carriers. Due to the possible component carrier bandwidths of 50 MHz, 100 MHz, 200 MHz, and 400 MHz for Fallback Group 2 80, the closest the user equipment 10 can come to utilizing the full bandwidth of 350 MHz is 300 MHz (one component carrier having a bandwidth of 100 MHz and one component carrier having a bandwidth of 200 MHz). Accordingly, there is 50 MHz of the allocated aggregated channel bandwidth that remains unused. In some embodiments, the possible component carrier bandwidths may be limited to 50 MHz, 100 MHz, and 200 MHz for Fallback Group 2 80, despite FIG. 4 listing 400 MHz as a possibility, as the 400 MHz component carrier bandwidth may not yet be implemented. Moreover, it should be understood that the possible component carrier bandwidths listed may be merely examples, and other bandwidths may also be contemplated.

Figure 5:
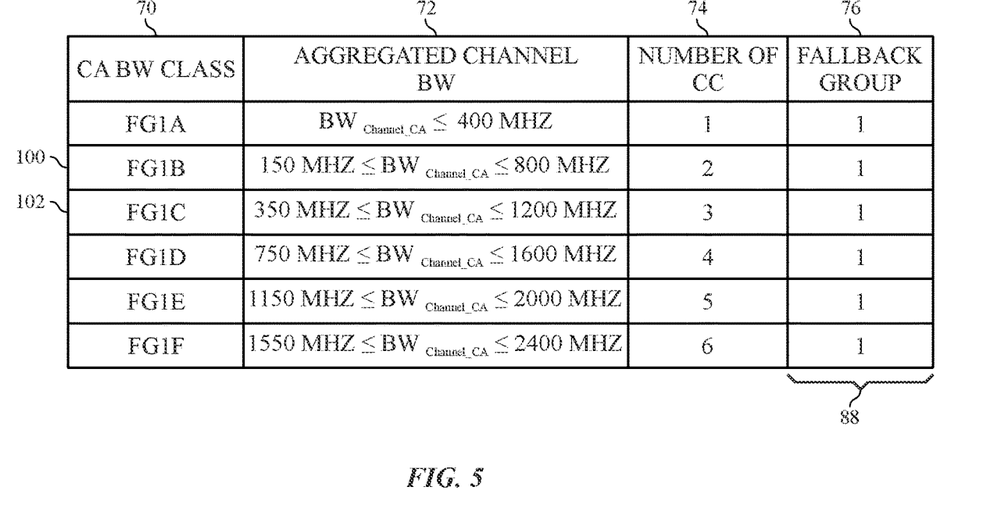
FIG. 5 is a carrier aggregation bandwidth class chart for Fallback Group 1 in NR FR2 that enables efficient carrier aggregation bandwidth usage, according to embodiments of the present disclosure.

To remedy at least this inefficiency, the disclosed embodiments extend at least some of the aggregated channel bandwidths for at least some fallback groups, such that aggregated channel bandwidths for the at least some fallback groups may overlap. In some embodiments, the lower bound for at least some aggregated channel bandwidths for the fallback groups may be extended. FIG. 5 is a carrier aggregation bandwidth class chart for Fallback Group 1 88 in NR FR2 that enables efficient carrier aggregation bandwidth usage, according to embodiments of the present disclosure. As illustrated, the lower bound for at least some aggregated channel bandwidths for Fallback Group 1 88 are extended (e.g., compared to those shown in FIG. 4). That is, for each CA BW class 70 listed, an upper bound for the CA BW class 70 may be the same as one having the same number of component carriers 74 and Fallback Group 76 as that shown in FIG. 4, but a lower bound may be different (e.g., extended). Moreover, carrier aggregation aggregated channel bandwidths of up to 2400 MHz are shown to be supported with 50 MHz resolution.

For example, as shown in FIG. 4, CA BW class B 90, which is the bandwidth class corresponding to having two component carriers in Fallback Group 1 88, has an upper bound of 800 MHz and a lower bound of 400 MHz. Returning back to FIG. 5, CA BW class FG1B (as indicated by 100) also corresponds to having two component carriers in Fallback Group 1 88. CA BW class FG1B has the same upper bound of 800 MHz as CA BW class B 90 shown in FIG. 4, but has a different lower bound of 150 MHz. As such, a general rule may be that, when the number of component carriers 74 (represented as n) is less than 3 (e.g., n<3), the lower bound for these aggregated channel bandwidths 72 of Fallback Group 1 88 may be set to 150 MHz.

When the number of component carriers 74 is greater or equal to 3, the lower bound for these aggregated channel bandwidths 72 of Fallback Group 1 88 may be defined by Expression 1 (in MHz) below:

$$(2n-5) \times 200 + 150 \quad n \geq 3 \quad \text{(Expression 1)}$$

For example, as shown in FIG. 4, CA BW class C 92, which is the bandwidth class corresponding to having three component carriers in Fallback Group 1 88, has an upper bound of 1200 MHz and a lower bound of 800 MHz. Returning back to FIG. 5, CA BW class FG1C (as indicated by 102), which also corresponds to having three component carriers in Fallback Group 1 88, has the same upper bound of 1200 MHz as CA BW class C 92, but has a different lower bound that may be determined using Expression 1 (e.g., 350 MHz).

Accordingly, for each CA BW class 70 listed, an upper bound for the CA BW class 70 may be the same as one having the same number of component carriers 74 and Fallback Group 76 as that shown in FIG. 4, but a lower bound may be different (e.g., extended). By extending the lower bound for aggregated channel bandwidths for Fallback Group 1 88, at least some of the CA BW classes 70 may overlap. For example, CA BW class FG1B 100 (greater than or equal to 150 MHz and less than or equal to 800 MHz) and CA BW class FG1C 102 (greater than or equal to 350 MHz and less than or equal to 1200 MHz) overlap in frequency. This overlap may enable, for an available aggregated channel bandwidth 72 in a fallback group 76, a first CA BW class 70 that uses a first number of component carriers 74, and a second CA BW class 70 that uses a second number of component carriers 74 different from the first. The different number of component carriers may enable more flexibility to more fully utilize the available aggregated channel bandwidth for communication.

As an illustrative example of more efficient bandwidth usage, an aggregated channel bandwidth of 550 MHz may now fall into either CA BW Class FG1B 100 or FG1C 102. However, since CA BW Class FG1B 100 only has two component carriers, and component carriers may only have 50 MHz resolution (e.g., the user equipment 10 may communicate with the base station 62 using component carrier bandwidths of 50 MHz, 100 MHz, 200 MHz, and 400 MHz), the two component carriers of CA BW Class FG1B 100 may, at best, utilize 500 MHz of the full aggregated channel bandwidth of 550 MHz (e.g., by using one component carrier having a bandwidth of 100 MHz and one component carrier having a bandwidth of 400 MHz). Similarly, following the 3GPP specification CA BW class chart shown in FIG. 4, the aggregated channel bandwidth of 550 MHz would fall under CA BW class B 90, which also corresponds to having two component carriers. As such, the network 60, following the 3GPP specification CA BW class chart shown in FIG. 4, would, at best, utilize 500 MHz of the full aggregated channel bandwidth of 550 MHz (e.g., by using one component carrier having a bandwidth of 100 MHz and one component carrier having a bandwidth of 400 MHz).

Instead, the network 60, via the base station 62 may determine that the CA BW Class FG1C 102 may better (e.g., fully) utilize the aggregated channel bandwidth of 550 MHz, and allocate the CA BW Class FG1C 102 to the user equipment 10. In particular, the CA BW Class FG1C 102 enables three component carriers for Fallback Group 1 88, enabling the user equipment 10 to fully utilize (e.g., utilize the full range of) the aggregated channel bandwidth of 550 MHz by using one component carrier having a bandwidth of 100 MHz, one component carrier having a bandwidth of 400 MHz, and one component carrier having a bandwidth of 50 MHz. The notation "FG1B," "FG1C," etc. is introduced as an example, and the concept may be implemented in the 3GPP specification utilizing any other suitable and/or convenient notation (e.g. by simple extension of the sequence of letters currently used in the specification).

Figure 6:
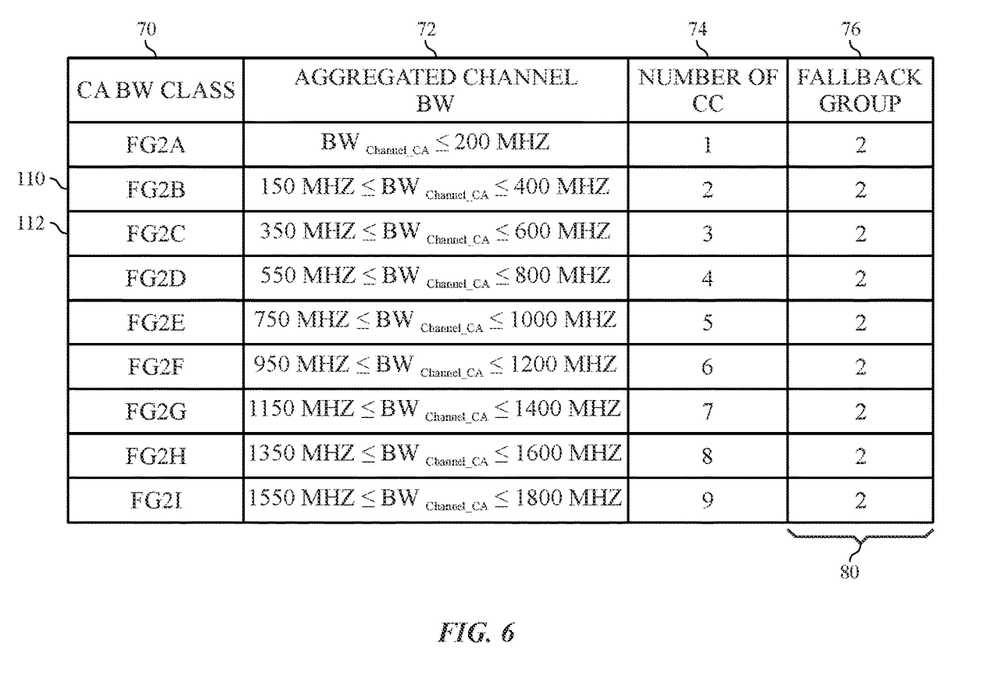
FIG. 6 is a carrier aggregation bandwidth class chart for Fallback Group 2 in NR FR2 that enables efficient carrier aggregation bandwidth usage, according to embodiments of the present disclosure.

FIG. 6 is a carrier aggregation bandwidth class chart for Fallback Group 2 80 in NR FR2 that enables efficient carrier aggregation bandwidth usage, according to embodiments of the present disclosure. As with the carrier aggregation bandwidth class chart for Fallback Group 1 88 in FIG. 5, the lower bound for at least some aggregated channel bandwidths for Fallback Group 2 80 are extended (e.g., compared to those shown in FIG. 4). That is, for each CA BW class 70 listed, an upper bound for the CA BW class 70 may be the same as one having the same number of component carriers 74 and Fallback Group 76 as that shown in FIG. 4, but a lower bound may be different (e.g., extended). Moreover, carrier aggregation aggregated channel bandwidths of up to 1800 MHz are shown to be supported with 50 MHz resolution.

For example, as shown in FIG. 4, CA BW class D 82, which is the bandwidth class corresponding to having two component carriers in Fallback Group 2 80, has an upper bound of 400 MHz and a lower bound of 200 MHz. Returning back to FIG. 6, CA BW class FG2B (as indicated by 110) also corresponds to having two component carriers in Fallback Group 2 80. CA BW class FG2B 110 has the same upper bound of 400 MHz as CA BW class D 82 shown in FIG. 4, but has a different lower bound of 150 MHz. As such, when the number of component carriers 74 (represented as n) is greater than or equal to 2 (e.g., n≥2), the lower bound for these aggregated channel bandwidths 72 of Fallback Group 2 80 may be defined by Expression 2 (in MHz) below:

$$(n-2) \times 200 + 150 \quad n \geq 2 \quad \text{(Expression 2)}$$

For example, as shown in FIG. 4, CA BW class E 84, which is the bandwidth class corresponding to having three component carriers in Fallback Group 2 80, has an upper bound of 600 MHz and a lower bound of 400 MHz. Returning back to FIG. 6, CA BW class FG2C (as indicated by 112), which also corresponds to having three component carriers in Fallback Group 2 80, has the same upper bound of 600 MHz as CA BW class E 84, but has a different lower bound that may be determined using Expression 2 (e.g., 350 MHz).

Accordingly, for each CA BW class 70 listed, an upper bound for the CA BW class 70 may be the same as one having the same number of component carriers 74 and Fallback Group 76 as that shown in FIG. 4, but a lower bound may be different (e.g., extended). By extending the lower bound for aggregated channel bandwidths for Fallback Group 2 80, at least some of the CA BW classes 70 may overlap. For example, CA BW class FG2B 100 (greater than or equal to 150 MHz and less than or equal to 400 MHz) and CA BW class FG1C 102 (greater than or equal to 350 MHz and less than or equal to 600 MHz) overlap in frequency.

As an illustrative example of more efficient bandwidth usage, an aggregated channel bandwidth of 350 MHz may now fall into either CA BW Class FG2B 110 or FG2C 112. However, since CA BW Class FG2B 110 only has two component carriers, and component carriers may only have 50 MHz resolution (e.g., the user equipment 10 may communicate with the base station 62 using component carrier bandwidths of 50 MHz, 100 MHz, and 200 MHz), the two component carriers of CA BW Class FG2B 110 may, at best, utilize 300 MHz of the full aggregated channel bandwidth of 350 MHz (e.g., by using one component carrier having a bandwidth of 100 MHz and one component carrier having a bandwidth of 200 MHz). Similarly, following the 3GPP specification CA BW class chart shown in FIG. 4, the aggregated channel bandwidth of 350 MHz would fall under CA BW class D 82, which also corresponds to having two component carriers. As such, the network 60, following the 3GPP specification CA BW class chart shown in FIG. 4, would, at best, utilize 300 MHz of the full aggregated channel bandwidth of 350 MHz (e.g., by using one component carrier having a bandwidth of 100 MHz and one component carrier having a bandwidth of 200 MHz).

Instead, the network 60, via the base station 62 may determine that the CA BW Class FG2C 112 may better (e.g., fully) utilize the aggregated channel bandwidth of 350 MHz, and allocate the CA BW Class FG2C 112 to the user equipment 10. In particular, the CA BW Class FG2C 112 enables three component carriers for Fallback Group 2 80, enabling the user equipment 10 to fully utilize (e.g., utilize the full range of) the aggregated channel bandwidth of 350 MHz by using one component carrier having a bandwidth of 100 MHz, one component carrier having a bandwidth of 200 MHz, and one component carrier having a bandwidth of 50 MHz. The notation "FG2B," "FG2C," etc. is introduced as an example, and the concept may be implemented in the 3GPP specification utilizing any other suitable and/or convenient notation (e.g. by simple extension of the sequence of letters currently used in the specification).

In this manner, allocating aggregated channel bandwidths for a fallback group that overlap in frequency may more fully utilize an allocated aggregated channel bandwidth for communication. Moreover, enabling more efficient utilization of allocated aggregated channel bandwidths scales well with increased aggregated channel bandwidth. For example, while conventional aggregated channel bandwidth may include bandwidth on the order of 100 MHz, the disclosed embodiments may enable efficient utilization of allocated aggregated channel bandwidths of any suitable range, such as 1600 MHz.

Figure 7:
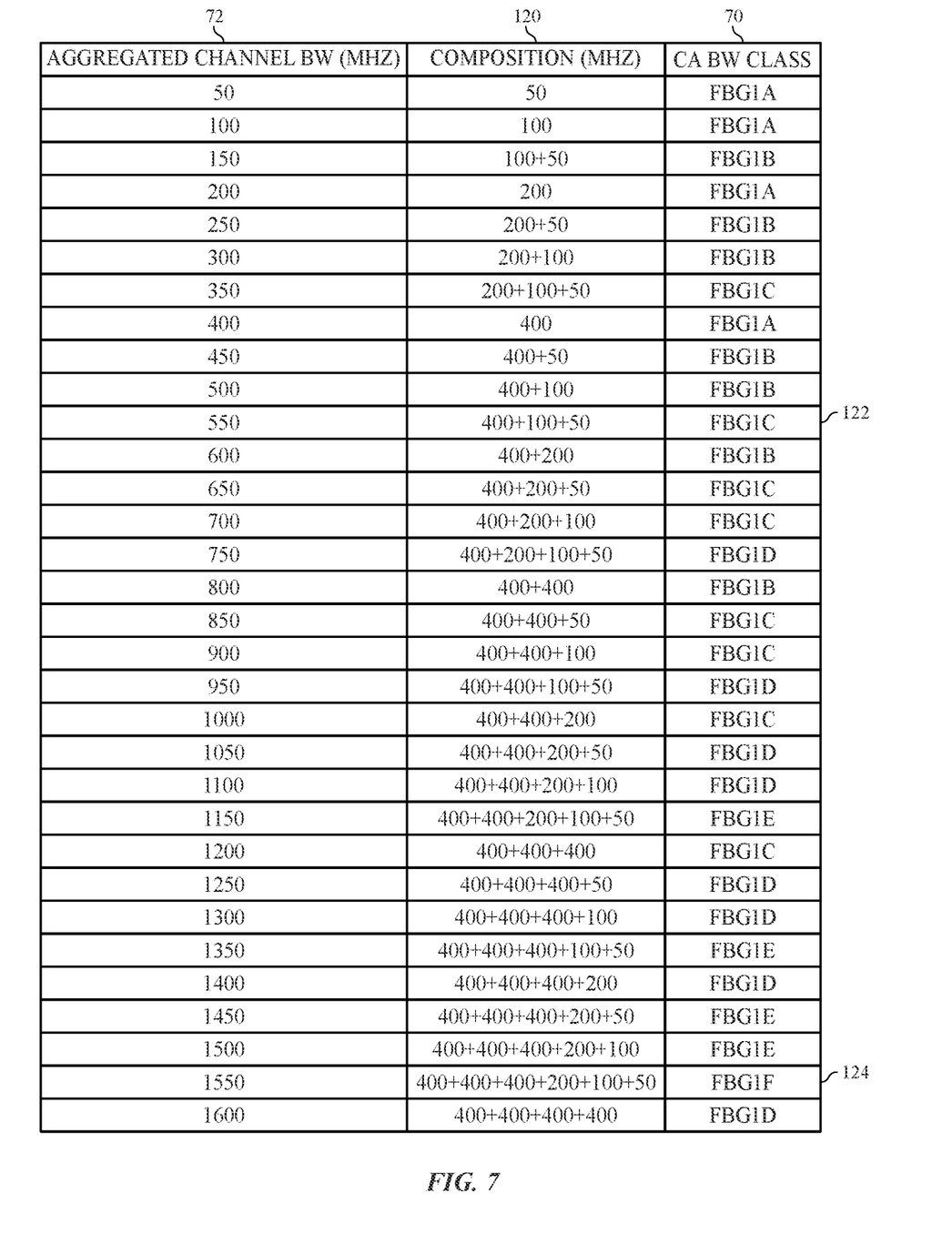
FIG. 7 is a table illustrating full aggregated channel bandwidth coverage for Fallback Group 1 in NR FR2 with up to 1600 megahertz (MHz) and 50 MHz resolution, according to embodiments of the present disclosure.

FIG. 7 is a table illustrating full aggregated channel BW 72 coverage for Fallback Group 1 88 with up to 1600 MHz and 50 MHz resolution, according to embodiments of the present disclosure. The table illustrates, for each aggregated channel BW 72 (in MHz), a composition 120 of bandwidths corresponding to component carriers (in MHz), and a CA BW class 70. For example, the previously discussed allocated aggregated channel bandwidth example of 550 MHz for Fallback Group 1 is included and identified as CA BW class FBG1C (as indicated by 122), which enables the network 60 to allocate a first component carrier of 400 MHz, a second component carrier of 100 MHz, and a third component carrier of 50 MHz to the user equipment 10. As illustrated, the table enables full aggregated channel BW 72 coverage for Fallback Group 1 88 with up to 1600 MHz and 50 MHz resolution (e.g., full coverage of 50 MHz to 1600 MHz bandwidths at 50 MHz increments) using up to six component carriers (e.g., where enabling an allocated aggregated channel bandwidth example of 1550 MHz using CA BW class FBG1F as indicated by 124).

Figure 8:
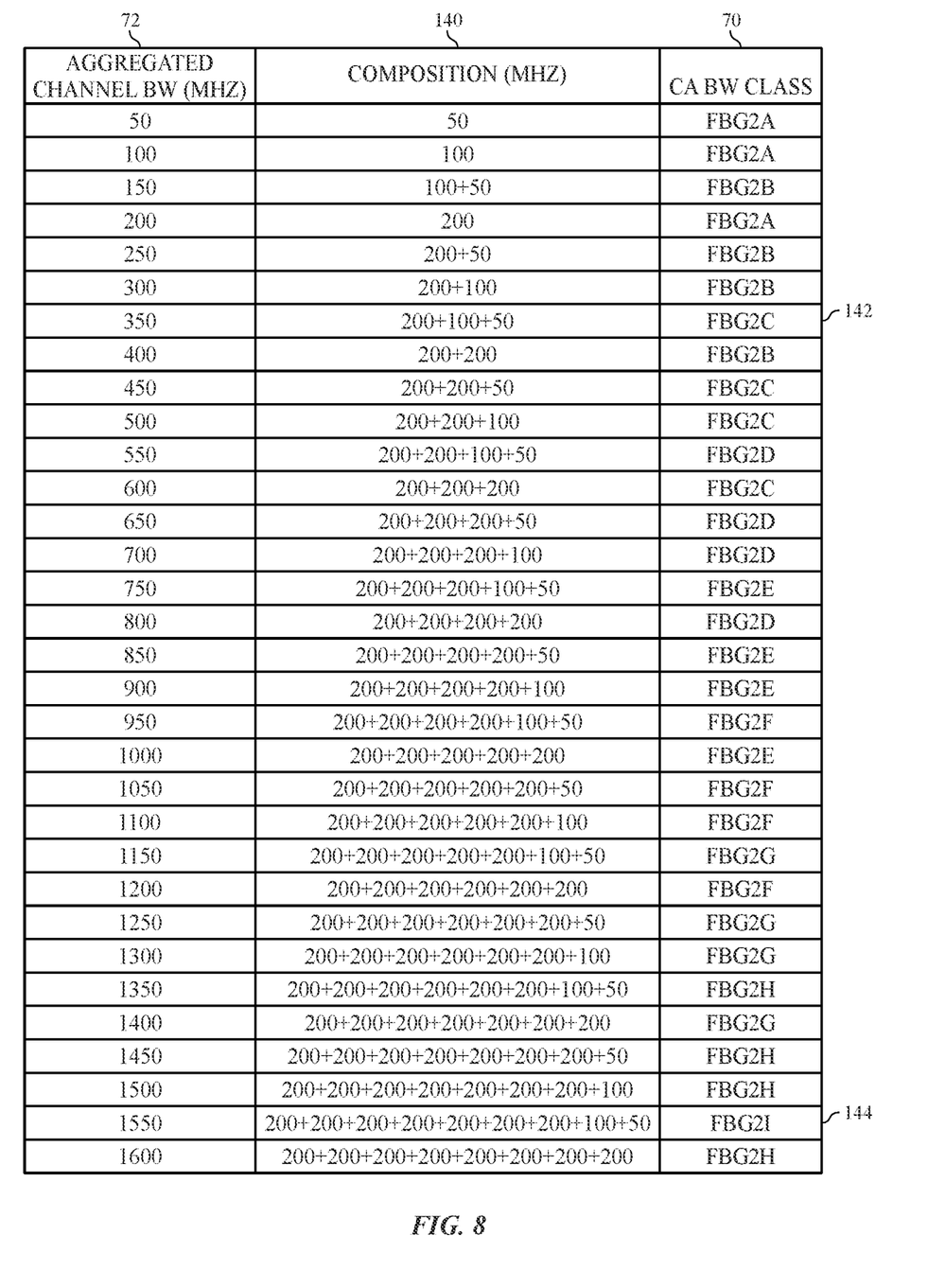
FIG. 8 is a table illustrating full aggregated channel bandwidth coverage for Fallback Group 2 in NR FR2 with up to 1600 megahertz (MHz) and 50 MHz resolution, according to embodiments of the present disclosure.

FIG. 8 is a table illustrating full aggregated channel BW 72 coverage for Fallback Group 2 80 with up to 1600 MHz and 50 MHz resolution, according to embodiments of the present disclosure. The table illustrates, for each aggregated channel BW 72 (in MHz), a composition 140 of bandwidths corresponding to component carriers (in MHz), and a CA BW class 70. For example, the previously discussed allocated aggregated channel bandwidth example of 350 MHz for Fallback Group 2 is included and identified as CA BW class FBG2C (as indicated by 142), which enables the network 60 to allocate a first component carrier of 200 MHz, a second component carrier of 100 MHz, and a third component carrier of 50 MHz to the user equipment 10. As illustrated, the table enables full aggregated channel BW 72 coverage for Fallback Group 2 80 with up to 1600 MHz and 50 MHz resolution (e.g., full coverage of 50 MHz to 1600 MHz bandwidths at 50 MHz increments) using up nine component carriers (e.g., where enabling an allocated aggregated channel bandwidth example of 1550 MHz using CA BW class FBG2I as indicated by 144).

Figure 9:
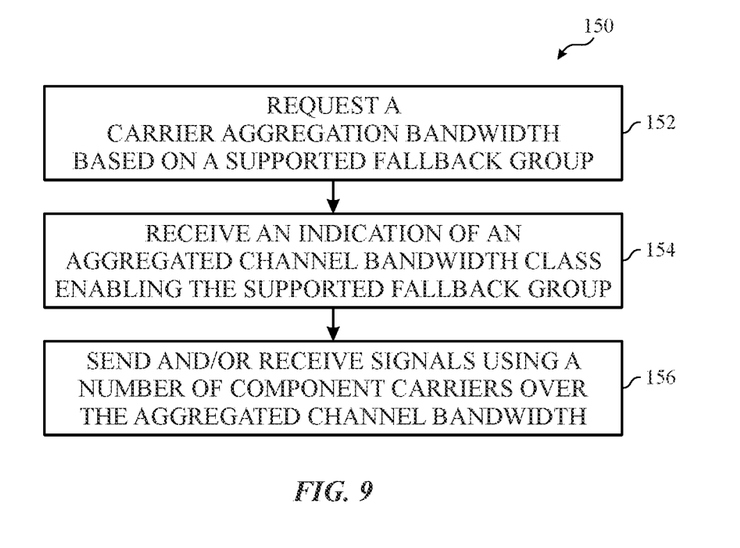
FIG. 9 is a flowchart of a method for the user equipment of FIG. 1 to more fully utilize an aggregated channel bandwidth, according to embodiments of the present disclosure.

FIG. 9 is a flowchart of a method 150 for the user equipment 10 to more fully utilize an aggregated channel bandwidth, according to embodiments of the present disclosure. Any suitable device (e.g., a controller) that may control components of the user equipment 10, such as the processor 12, may perform the method 150. In some embodiments, the method 150 may be implemented by executing instructions stored in a tangible, non-transitory, computer-readable medium, such as the memory 14 or storage 16, using the processor 12. For example, the method 150 may be performed at least in part by one or more software components, such as an operating system of the user equipment 10, one or more software applications of the user equipment 10, and the like. While the method 150 is described using steps in a specific sequence, it should be understood that the present disclosure contemplates that the described steps may be performed in different sequences than the sequence illustrated, and certain described steps may be skipped or not performed altogether.

In process block 152, the processor 12 of user equipment 10 requests a carrier aggregation bandwidth based on a supported fallback group. In particular, the processor 12 may receive or determine a fallback group 76 that it supports. The processor 12 may then cause the transmitter 52 of the user equipment 10 to transmit the request to the base station 62, and the request may include the supported fallback group or groups 76 (e.g., Fallback Group 2 80).

In process block 154, the processor 12 receives an indication (e.g., via the receiver 54 of the user equipment 10) of an aggregated channel bandwidth class 70 that enables the supported fallback group 76. In particular, the network 60 may determine the aggregated channel bandwidth class 70 based on the supported fallback group 76 received from the user equipment 10, and send an indication of the determined aggregated channel bandwidth class 70 to the user equipment 10. As discussed above, the aggregated channel bandwidth class 70 may overlap in frequency with at least one other aggregated channel bandwidth class 70 for the fallback group 76. Moreover, the aggregated channel bandwidth class 70 may enable full or complete utilization of the corresponding aggregated channel bandwidth 72 using the component carrier bandwidths associated with that fallback group 76 (or at least more utilization of the aggregated channel bandwidth 72 compared to the 3GPP specification CA BW class chart shown in FIG. 4). Referring to a previous example, the CA BW Class FG2C 112 enables the user equipment 10 to fully utilize (e.g., utilize the full range of) the full aggregated channel bandwidth of 350 MHz by using three component carriers having bandwidths of 50 MHz, 100 MHz, and 200 MHz in Fallback Group 2 80, compared to the 3GPP specification CA BW class chart shown in FIG. 4 (which only enables use of 300 MHz of the allocated aggregated channel bandwidth of 350 MHz, as it, at best, enables use of two component carriers having bandwidths of 100 MHz and 200 MHz).

In process block 156, the processor 12 sends and/or receives signals using a number of component carriers 74 over the received aggregated channel bandwidth 72 associated with the aggregated channel bandwidth class 70 and based on the supported fallback group 76. In the previous example, the processor 12 may cause the transmitter 52 and/or the receiver 54 to send and/or receive signals (e.g., wireless signals, radio frequency signals) using the full aggregated channel bandwidth of 350 MHz via the three component carriers having bandwidths of 50 MHz, 100 MHz, and 200 MHz in Fallback Group 2 80. It should be understood that, in some cases, the processor 12 may store the available aggregated channel bandwidth class 70 that fully or more fully utilizes each aggregated channel bandwidth 72 in the memory 14 or storage device 16 of the network 60, the base station 62, and/or the user equipment 10, such as in the form of a lookup table, and the processor 12 may determine the number of component carriers 74 by looking up the aggregated channel bandwidth class 70 in the memory 14 or storage device 16, and determining the corresponding number of component carriers 74. In this manner, the method 150 enables the user equipment 10 to more fully utilize an aggregated channel bandwidth.

Figure 10:
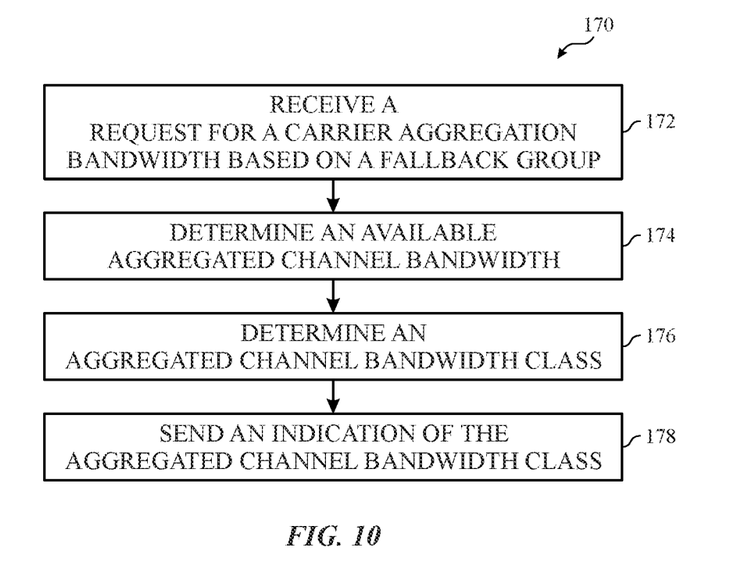
FIG. 10 is a flowchart of a method for the communication network and/or the base station of FIG. 3 to provide an aggregated channel bandwidth that may be more fully utilized for communication, according to embodiments of the present disclosure.

FIG. 10 is a flowchart of a method 170 for the network 60 and/or the base station 62 to provide an aggregated channel bandwidth that may be more fully utilized for communication, according to embodiments of the present disclosure. Any suitable device (e.g., a controller) that may control components of the network 60 and/or the base station 62, such as the processor 12, may perform the method 170. In some embodiments, the method 170 may be implemented by executing instructions stored in a tangible, non-transitory, computer-readable medium, such as the memory 14 or storage 16, using the processor 12. For example, the method 170 may be performed at least in part by one or more software components, such as an operating system of the network 60 and/or the base station 62, one or more software applications of the network 60 and/or the base station 62, and the like. While the method 170 is described using steps in a specific sequence, it should be understood that the present disclosure contemplates that the described steps may be performed in different sequences than the sequence illustrated, and certain described steps may be skipped or not performed altogether.

In process block 172, the processor 12 of the network 60 and/or the base station 62 receives a request for a carrier aggregation bandwidth based on a fallback group 76 from the user equipment 10. In particular, the request may include the fallback group or groups 76 supported by the user equipment 10 (e.g., Fallback Group 2 80). The request may be received via the receiver 54 of the base station 62.

In process block 174, the processor 12 determines an available aggregated channel bandwidth 72. In particular, at certain times, available aggregated channel bandwidths 72 may be limited (e.g., due to other user equipment 10 or devices utilizing network resources. As such, the processor 12 may determine what aggregated channel bandwidth 72 is available to allocate to the user equipment 10. For example, the processor 12 may determine an aggregated channel bandwidth 72 of 350 MHz is available to allocate to the user equipment 10.

In process block 176, the processor 12 determines an aggregated channel bandwidth class 70 based on the available aggregated channel bandwidth 72. The aggregated channel bandwidth class 70 may overlap in frequency with at least one other aggregated channel bandwidth class 70 for the fallback group 76. In particular, the processor 12 may determine the aggregated channel bandwidth class 70 to fully or more fully utilize the corresponding aggregated channel bandwidth 72 using the component carrier bandwidths associated with that fallback group 76. That is, the processor 12 may compare the available aggregated channel bandwidth classes 70, and determine which available aggregated channel bandwidth classes 70 increases or maximizes usage of the aggregated channel bandwidth 72. In some cases, the processor 12 may determine, by applying the available bandwidths (e.g., 50 MHz, 100 MHz, 200 MHz, 400 MHz) for each component carrier to each component carrier available for the available aggregated channel bandwidth classes 70, the available aggregated channel bandwidth class 70 that fully or more fully utilizes the aggregated channel bandwidth 72 of the available aggregated channel bandwidth class 70.

For the example above, if the processor 12 receives an indication that the user equipment 10 supports Fallback Group 2 80 in process block 172, and determines the available aggregated channel bandwidth 72 to be 350 MHz in process block 174, then the processor 12 may determine the available aggregated channel bandwidth class 70 as FG2B 110 or FG2C 112, as both support aggregated channel bandwidths 72 of 350 MHz, as shown in FIG. 6. However, the processor 12 may determine to allocate the available aggregated channel bandwidth class 70 FG2C 112 to the user equipment 10, as it enables the user equipment 10 to fully utilize the full aggregated channel bandwidth of 350 MHz by using three component carriers having bandwidths of 50 MHz, 100 MHz, and 200 MHz (instead of FG2B 110, which, at best, could only utilize 300 MHz of the full aggregated channel bandwidth of 350 MHz by using two component carriers having bandwidths of 100 MHz and 200 MHz). It should be understood that, in some cases, the processor 12 may store the available aggregated channel bandwidth class 70 that fully or more fully utilizes each aggregated channel bandwidth 72 in the memory 14 or storage device 16 of the network 60, the base station 62, and/or the user equipment 10, such as in the form of a lookup table, and the processor 12 may determine the available aggregated channel bandwidth class 70 that fully or more fully utilizes the aggregated channel bandwidth 72 by looking up the aggregated channel bandwidth 72 in the memory 14 or storage device 16, and determining the corresponding aggregated channel bandwidth class 70.

In process block 178, the processor 12 sends (e.g., using the transmitter 52 of the base station 62) an indication of the aggregated channel bandwidth class 70 to the user equipment 10. For the example above, the processor 12 may send the full and available aggregated channel bandwidth 72 of 350 MHz, rather than that of 300 MHz, to the user equipment 10, as the user equipment 10 may fully utilize the aggregated channel bandwidth 72 of 350 MHz using three component carriers having bandwidths of 50 MHz, 100 MHz, and 200 MHz. Without the disclosed embodiments, which implement overlapping aggregated channel bandwidth classes 70, the processor 12 would follow the 3GPP specification CA BW class chart shown in FIG. 4, and at best only be able to send an aggregated channel bandwidth 72 of 300 MHz, as, without overlapping aggregated channel bandwidth classes 70, only two component carriers would be available to the user equipment, which would limit utilization of the aggregated channel bandwidth 72 to a first component carrier having a bandwidth of 200 MHz and a second component carrier having a bandwidth of 100 MHz. In this manner, the method 170 enables the network 60 and/or the base station 62 to provide an aggregated channel bandwidth 72 that may be more fully utilized for communication.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
receiving, at a base station, a request for a carrier aggregation bandwidth based on a fallback group from user equipment;
determining, via processing circuitry, an available aggregated channel bandwidth; and
sending, from the base station, an indication of an aggregated channel bandwidth class to the user equipment based on the available aggregated channel bandwidth for the fallback group, the aggregated channel bandwidth class overlapping with another aggregated channel bandwidth class for the fallback group, the aggregated channel bandwidth class being of a plurality of aggregated channel bandwidth classes that utilizes a full range of available aggregated channel bandwidths from 50 megahertz to at least up to 1550 megahertz at 50 megahertz resolution using at least five component carriers.

2. The method of claim 1, wherein the aggregated channel bandwidth class is implemented using a first number of component carriers, the other aggregated channel bandwidth class is implemented using a second number of component carriers, and the first number of component carriers is different than the second number of component carriers.

3. The method of claim 1, wherein the aggregated channel bandwidth class utilizes a lowest frequency of the available aggregated channel bandwidth to a highest frequency of the available aggregated channel bandwidth.

4. The method of claim 1, wherein the aggregated channel bandwidth class corresponds to a first range of bandwidths that comprises the available aggregated channel bandwidth, and the other aggregated channel bandwidth class corresponds to a second range of bandwidths that comprises the available aggregated channel bandwidth.

5. The method of claim 1, wherein the fallback group enables a maximum supported component carrier bandwidth of 400 megahertz.

6. The method of claim 1, wherein the fallback group enables a maximum supported component carrier bandwidth of 200 megahertz.

7. The method of claim 1, wherein the aggregated channel bandwidth class utilizes the full range of available aggregated channel bandwidths from 50 megahertz to 1600 megahertz at the 50 megahertz resolution using at least 7 component carriers.

8. An electronic device comprising:
a receiver configured to receive a first signal from user equipment;
a transmitter configured to send a second signal to the user equipment; and
at least one processor configured to
receive a request for a carrier aggregation bandwidth based on a fallback group from the user equipment,
determine an available aggregated channel bandwidth, and
send, via the at least one processor, an indication of an aggregated channel bandwidth class to the user equipment based on the available aggregated channel bandwidth for the fallback group, the aggregated channel bandwidth class being of a plurality of aggregated channel bandwidth classes that utilizes a full range of available aggregated channel bandwidths from 50 megahertz to at least up to 1550 megahertz at 50 megahertz resolution using at least 5 component carriers and enabling the user equipment to utilize a full range of the available aggregated channel bandwidth using the number of component carriers.

9. The electronic device of claim 8, wherein the available aggregated channel bandwidth is greater than 400 megahertz.

10. The electronic device of claim 8, wherein the available aggregated channel bandwidth is 1600 megahertz.

11. The electronic device of claim 8, wherein the fallback group enables a maximum supported component carrier bandwidth of 400 megahertz, and wherein the aggregated channel bandwidth class is of a plurality of aggregated channel bandwidth classes that utilizes a full range of available aggregated channel bandwidths from 50 megahertz to 1600 megahertz at 50 megahertz resolution using six component carriers.

12. The electronic device of claim 11, wherein the fallback group comprises the Fallback Group 1.

13. The electronic device of claim 8, wherein the fallback group enables a maximum supported component carrier bandwidth of 200 megahertz, and wherein the aggregated channel bandwidth class is of a plurality of aggregated channel bandwidth classes that utilizes a full range of available aggregated channel bandwidths from 50 megahertz to 1600 megahertz at 50 megahertz resolution using nine component carriers.

14. The electronic device of claim 13, wherein the fallback group comprises the Fallback Group 2.

15. User equipment, comprising:
- a transmitter configured to communicatively couple to a base station;
- a receiver configured to communicatively couple to the base station; and
- at least one processor configured to
  - request, via the transmitter, a carrier aggregation bandwidth based on a supported fallback group from the base station;
  - receive, via the receiver, an indication of an aggregated channel bandwidth class enabling the supported fallback group, the aggregated channel bandwidth class being of a plurality of aggregated channel bandwidth classes that utilizes a full range of available aggregated channel bandwidths from 50 megahertz to at least up to 1550 megahertz at 50 megahertz resolution using at least 5 component carriers, and the aggregated channel bandwidth classes, and wherein the aggregated channel bandwidth class is overlapping with another aggregated channel bandwidth class for the supported fallback group; and
  - send, via the transmitter, or receive, via the receiver, a signal to or from the base station over an aggregated channel bandwidth based on the aggregated channel bandwidth class.

16. The user equipment of claim 15, wherein the at least one processor configured to send, via the transmitter, or receive, via the receiver, the signal to or from the base station using a number of component carriers based on the aggregated channel bandwidth class.

17. The user equipment of claim 15, wherein the aggregated channel bandwidth class is of a plurality of aggregated channel bandwidth classes that utilizes a full range of available aggregated channel bandwidths at 50 megahertz resolution, wherein the full range of available aggregated channel bandwidths comprises up to 1600 megahertz.

18. The user equipment of claim 15, wherein the aggregated channel bandwidth class is implemented using a first number of component carriers, the other aggregated channel bandwidth class is implemented using a second number of component carriers, and the first number is different than the second number.

19. The user equipment of claim 15, wherein the aggregated channel bandwidth class utilizes a lowest frequency of an available aggregated channel bandwidth to a highest frequency of the available aggregated channel bandwidth.

20. The user equipment of claim 15, wherein the aggregated channel bandwidth class corresponds to a first range of bandwidths that comprises an available aggregated channel bandwidth, and the other aggregated channel bandwidth class corresponds to a second range of bandwidths that comprises the available aggregated channel bandwidth.

* * * * *